Jan. 1, 1952  J. L. BRACK  2,580,509
VEHICLE BED LOCKING ARRANGEMENT
Original Filed March 31, 1943  3 Sheets-Sheet 1
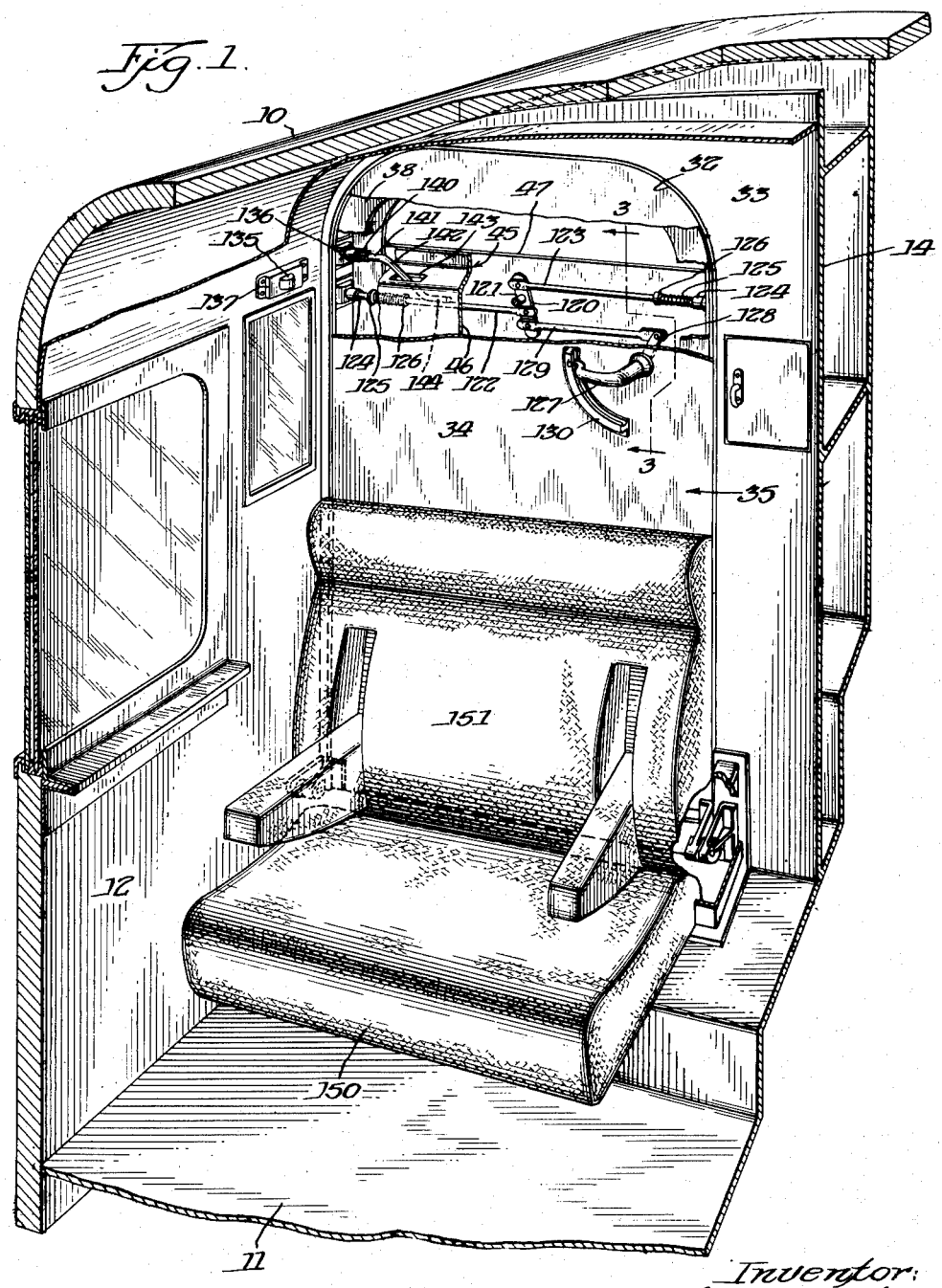
Inventor:
Joseph L. Brack.
By Oscar Hochberg,
Atty.

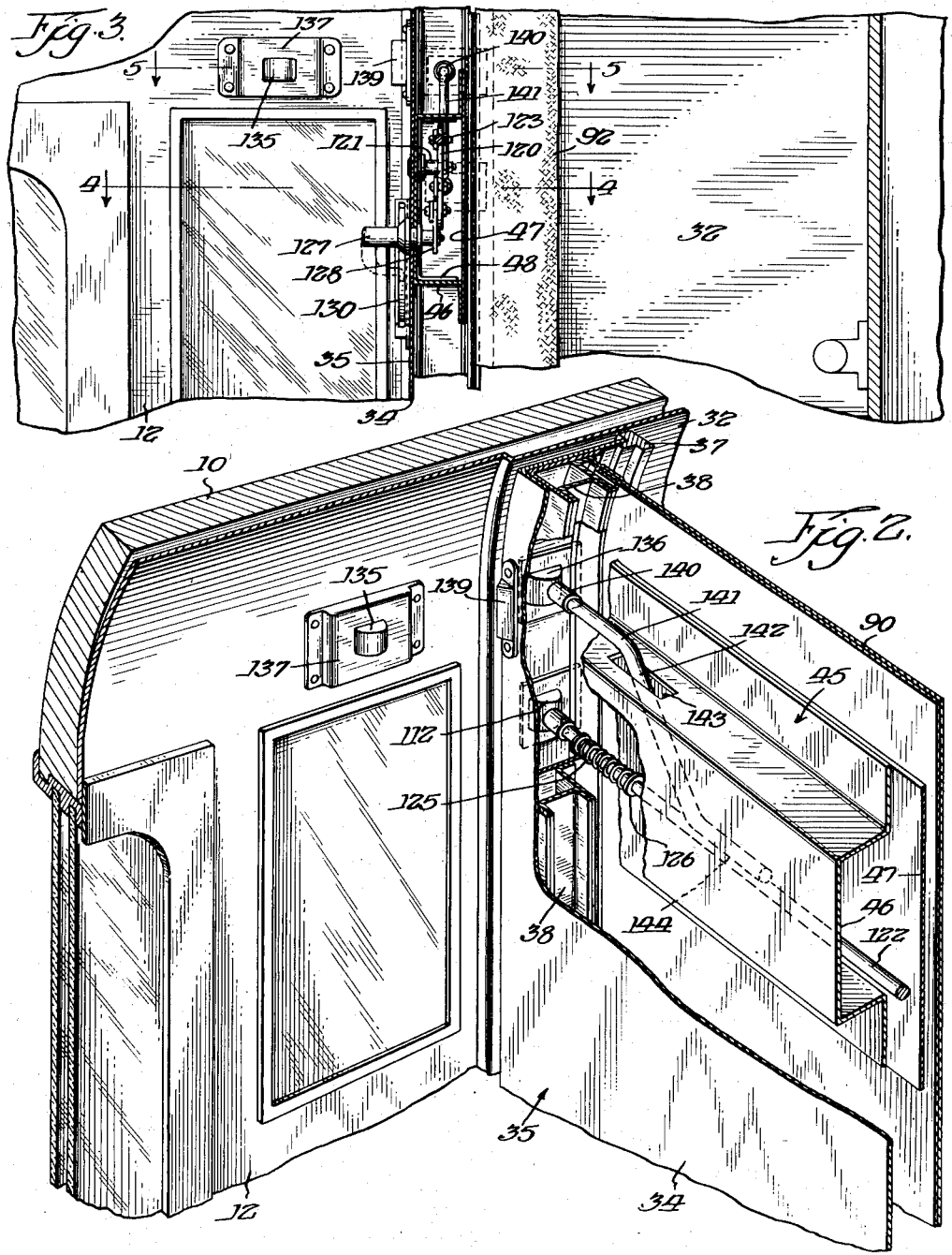

Jan. 1, 1952  J. L. BRACK  2,580,509
VEHICLE BED LOCKING ARRANGEMENT
Original Filed March 31, 1943  3 Sheets-Sheet 3
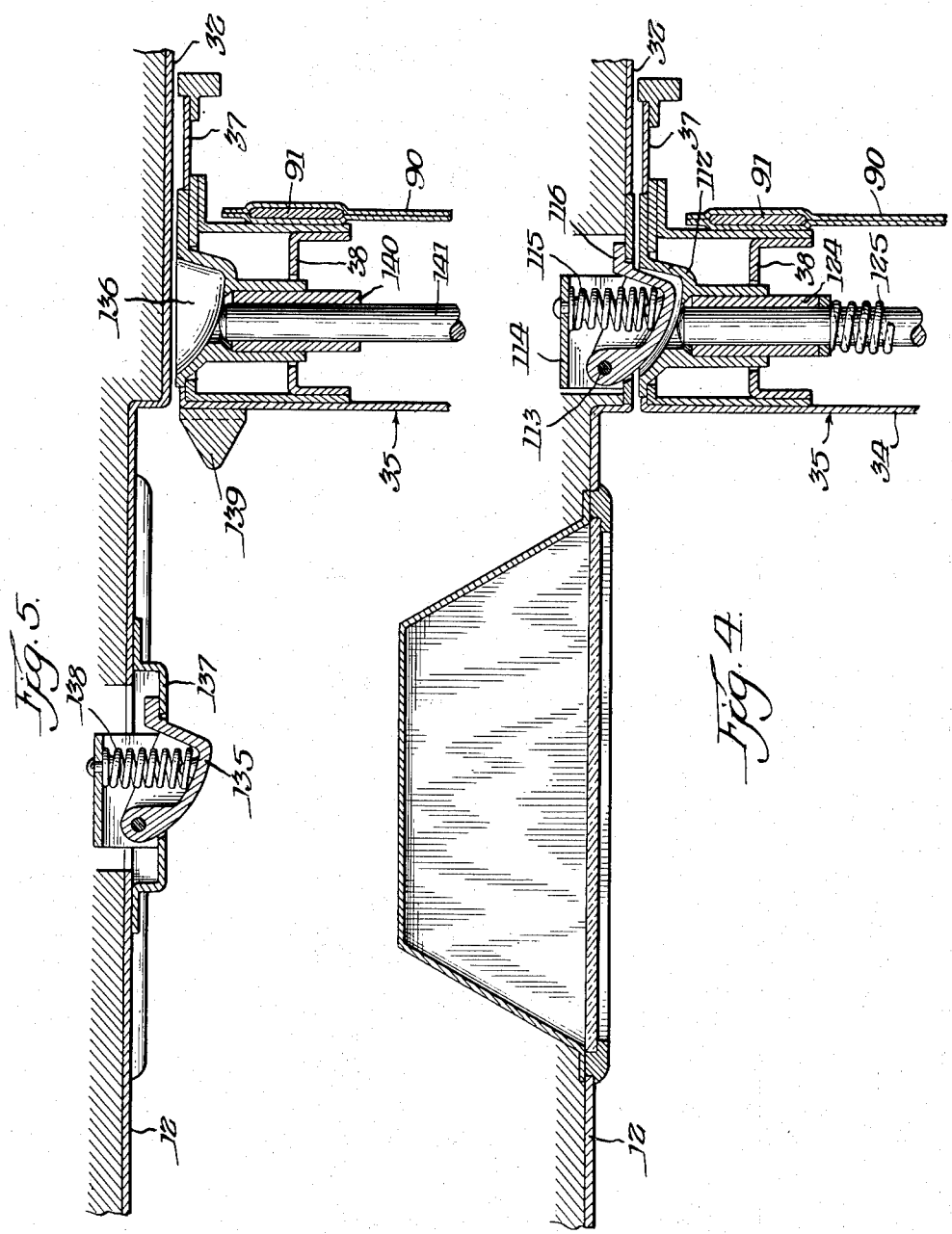
Inventor:
Joseph L. Brack.
By Oscar Hochberg Atty.

Patented Jan. 1, 1952

2,580,509

UNITED STATES PATENT OFFICE 2,580,509

VEHICLE BED LOCKING ARRANGEMENT

Joseph L. Brack, Chicago, Ill., assignor to Pullman-Standard Car Manufacturing Company, Chicago, Ill., a corporation of Delaware Original application March 31, 1943, Serial No. 481,258, now Patent No. 2,443,552, dated June 15, 1948. Divided and this application May 22, 1946, Serial No. 671,481

6 Claims. (Cl. 5—167)

This invention relates to railway sleeping cars and has for its primary purpose the provision of a folding bed adapted to be folded flush within a wall and having releasable locking means for securing the bed in the wall.

The principal object of the invention is realized in the provision of safety locking mechanism for the bed affording releasable means for locking the bed in fully retracted position within the wall and having a releasable safety catch at an intermediate open position of the bed which, when engaged, prevents further opening movement of the bed toward extended position until the catch is released by manipulation of the lock operating mechanism on the bed.

The foregoing and other objects of the invention are attained by the bed construction and locking arrangement illustrated in the accompanying drawings, in which:

Fig. 1 is a general perspective view of the folding bed arrangement with an associated seat coacting therewith and showing the bed in vertical fully retracted position where it is securely maintained by the locking mechanism of this invention, and having portions of the bed broken away better to reveal the general loction of the pivotal mounting and the details of the latching or locking arrangement for the bed, normally concealed within the bed structure, and the method of operating the mechanism by means of the operating handle exposed on the surface of the bed;

Fig. 2 also is a perspective view but to larger scale with portions of the bed broken away to reveal the details of the bed locking and safety lock arrangement at the side wall and clearly revealing the projectable rod arrangement for engaging the bed locking latch to release the bed from the fully retracted position and for engaging the safety locking latch on the side wall to release the bed at the intermediate safety position and showing the spring for retracting the rod mechanism and the striker plate on the face of bed in line with the safety lock for pressing the latch to retracted position to enable the forward edge of the bed to pass;

Fig. 3 is a fragmentary sectional view taken on the line 3—3 of Fig. 1 showing the bed locking mechanism mounted within the reinforcing casing of the bed structure with the bed in fully closed position and with the safety lock on the side wall in a position to engage the bed at an intermediate open position thereof;

Fig. 4 is a detail horizontal sectional view taken through bed, side wall and locking mechanism on the line 4—4 of Fig. 3 showing the bed locked in fully closed position by the locking latch on the side wall of the bed recess with the projectable, spring retracted rod in position to press the latch from engagement with the receptacle in the side wall of the bed to release the bed for opening movement; and Fig. 5 also is a detail sectional view similar to Fig. 4 taken on the line 5—5 of Fig. 3 and showing the safety locking latch on the side wall adapted to enter the receptacle in the side wall of the bed in an intermediate open position of the bed and also releasable by the projectable rod pressing it from engagement in the receptacle to enable the bed to pass when it is desired to move the bed to fully open position. The relation of the striker plate to the safety locking latch is clearly illustrated in this view.

This application is a division of my co-pending application Serial No. 481,258, filed March 31, 1943, for Vehicle Bed Arrangement, which became Patent No. 2,443,552, on June 15, 1948.

In the drawings, 10 represents a railway car having a room 11 including a side wall 12 and a cross partition 14. The partition 14 is relatively deep in a direction normal to the plane of the partition to provide a recess or alcove 32 opening into the room for the reception of a folding bed 35 and its associated bedding. At that side facing in the room, the partition is provided with a plane surface 33 about the bed alcove and with which the bottom wall 34 of the bed is adapted to fit substantially flush.

The bed 35 comprises a box-like structure including the bottom closing wall 34 and continuous side rail members 37 which extend along both sides of the bed and are curved about the corners of the bed to provide an end footboard member. The end footboard is of increased height with respect to the side rail members. A buit-up box section frame structure 38 extends entirely around the bed to provide the rigidity necessary to strengthen the bed against distortion in service. The bed frame is further reinforced intermediate the length of the folding bed by means of a box section structure 45 extending between and connecting the side rail structures 38 of the bed frame and comprised of a flanged channel member 46 secured with its web against the bottom wall 34 and having a closing plate 47 extending across its flanges to complete the box section. A reinforcing channel-shaped plate 48 (see Fig. 3) is nested within the flanged channel 46 at the center of the bed to provide a mounting for actuating mechanism of a bed locking arrangement hereinafter to be described. All of the bed construction thus far described comprises an integrated arrangement of parts secured by welding to provide a unitary structure which may be mounted for swinging movements in a vertical plane about a horizontal axis located substantially as indicated in Fig. 1 by mechanism the details of which form no part of the present invention.

In order resiliently to support a mattress 92, the bed is provided with a flexible mattress supporting member 90 which, in the form shown, comprises a flexible and resilient membrane secured over a rigidifying frame 91 which is secured to the upper surface of the bed frame structure 38 at all four sides of the bed with the mattress supporting member 90 supported in spaced relation to the bottom wall 34 of the bed. A seat and folding backrest arrangement 150 and 151 is cooperatively associated with the folding bed 35 and is adapted automatically to be folded to an inoperative position when the bed is opened to operative position and returned to operative seating position when the bed is closed to its fully retracted position in the bed alcove 32, as shown in Fig. 1.

The folding bed 35 is adapted to be locked in fully closed position by mechanism which is manually releasable when it is desired to open the bed for use. The mechanism for locking the bed (see Fig. 4) comprises a pair of automatically operating spring pressed latches 111 mounted, one in each side wall of the bed alcove 32 and so located as to engage keepers 112 in the respective side rails 37 of the bed. Each latch 111 is pivoted at 113 in a retainer member 114 which is secured in the side wall of the bed alcove. Spring 115 between the latch and retainer member urges the latch at all times in an outward direction automatically to engage the keeper 112 when the bed is pressed into the alcove. Stop 116 on the latch limits its outward movement. The latch 111 is so positioned in the bed alcove in regard to its pivotal action as to be retracted by the passage of the bed into the alcove and then to spring into the keeper 112 as the bed reaches final position to present a shoulder acting as a stop to prevent outward movement of the bed until the latch 111 is manually retracted by releasing mechanism actuated by the occupant of the room.

The releasing mechanism for retracting the latches 111 is enclosed within the box structure 45 and is best illustrated in Figs. 1 and 2. The mechanism includes a center fulcrum lever 120 pivotally mounted at 121 on a fixed pivot which is secured to the reinforcing channel plate 48 in the flanged channel 46. Latch release rods 122 and 123 are pivotally connected to the fulcrum lever 120 at opposite sides of the pivotal support 121 and extend in opposite directions through the box structure 45 across the bed to enter the respective keepers 112 in the side rails 37 of the bed. As best shown in Fig. 4, the respective latch rods 122 and 123 each pass through a bearing member 124 mounted in the keepers 112 and through which they are adapted to reciprocate in the operation of releasing the latches 111. The rods 122 and 123 are each provided with a shoulder 126 against which a compression spring 125 is adapted to seat and which exerts a force against the respective bearings 124 and the keepers 112 normally to maintain the latch rods withdrawn from engagement with the latches 111. The latch rods are actuated by means of an operating handle 127 which is disposed on the face of the bed 35 in position to be grasped by a person manipulating the bed from within the room. The operating handle extends through the bottom wall 34 of the bed into the interior of the box 45 enclosing the latch releasing mechanism where it is provided with a lever arm 128 which is operatively connected with the lower extremity of the center fulcrum lever 120 by means of a strut 129 through the medium of which the latch releasing rods are actuated against the resistance of springs 125 from the handle 127.

With the bed 35 disposed vertical within the alcove 32 and locked by the engagement of latches 111 within keepers 112, latch rods 122 and 123 are normally retracted by action of springs 125 with the fulcrum lever 120 disposed at an angle to one side of the vertical, as shown in Fig. 1, with rod 123 connected thereto above the pivot 121 and rod 122 connected below the pivot. The lever arm 128, connected to the lower extremity of the fulcrum lever by strut 129, is disposed at an angle to the opposite side of the vertical from that of the fulcrum lever, with the operating handle 127 disposed horizontally at the opposite side of its pivot point from the direction of inclination of the lever arm and between such pivot point and the connection of the lever 128 to the fulcrum by the strut 129. When it is desired to withdraw the bed from the alcove, the operator grasps the handle 127 and rotates it contraclockwise (in the embodiment illustrated) approximately sixty-eight degrees, which action, by means of the lever arm 128 and connection 129, rotates the fulcrum lever 120 clockwise to thrust the rods 122 and 123 in opposite directions into the respective keepers and thereby engage the latches 111 and press them from engagement with the keepers 112 until the keepers pass the latches, after which the springs 125 will return the entire mechanism to normal when the handle 127 is released, and after the bed has passed, springs 115 will return latches 111 to normally extended position. By the opposite inclination of the levers 120 and 128, an operating stroke of maximum length may be obtained fully to retract the latches 111 in all circumstances without any binding between the various parts of the mechanism. The operating handle 127, in addition to actuating the release mechanism, is utilized also to pull the bed out of the alcove, and in order to prevent any possible distortion, is provided with a guide 130 for the free end of the handle, which is adapted to operate through a track in the guide during actuation of the releasing mechanism. The guide is secured to the face of the bed 35 and comprises a segment of a circle so located as to include the full operating range of the handle. When the bed is pushed fully into the alcove 32, the latches 111, under influence of springs 115, will automatically engage the keepers 112 to retain the bed in retracted position.

In the type of railway car room in which the bed of this invention is adapted to be used, it is customary for the occupants of the various rooms, upon arising, to push the bed 35 into the alcove 32 in order to proceed about the preparation of their toilet, but sometimes due to disarrangement of the bedding, the bed is prevented from entering the alcove to such extent as to be retained by the latches 111, which, if not engaged in the keepers 112, leaves the bed free to move toward the fully open position. In order to prevent the bed, under such circumstances, from being thrown toward open position suddenly by reason of jarring impacts arising from operation of the car in a train, a safety catch is provided which is adapted to prevent the bed from moving any farther than an intermediate position without continued or repeated manipulation of the bed operating handle 127.

As best shown in Figs. 1, 2, 3 and 5, an intermediate safety catch 135 is located upon the side wall 12 of the car in position to engage a keeper 136 disposed in the side rail 37 of the bed as the bed moves out of the alcove 32. The safety catch is similar in operation to the locking latch 111 and is mounted in a housing 137 which is secured upon the side wall 12 but otherwise functions exactly like the locking latch, with a spring 138 for urging the catch outwardly, automatically to engage the keeper 136 as the bed moves to a position where the keeper is aligned with the safety catch whereby to prevent further movement of the bed toward open position. The safety catch is at all times normally disposed within the path of the bed under influence of spring 138, as best illustrated in Fig. 5, so that in order to get the face of the bed past the shoulder presented by the catch, it is necessary to provide an inclined strike plate 139 on the face of the bed in a position to engage the safety catch on its inclined surface as the bed is opened to press the catch out of the way when the bed approaches the point of engagement therewith. When the bed reaches a point where the keeper 136 in the side rail thereof coincides with the catch member, the latter member enters the keeper under pressure of spring 138 thereby positively to prevent further opening movement of the bed. The catch 135 is disposed upon the side wall 12 at a point sufficiently removed from the fully closed position of the bed to enable anyone operating the bed to push the bed at least this far in the closing movement in spite of any binding action caused by disarranged bedding and is located in the path of the arc described by the keeper 136 so that when the bed is pushed to the intermediate position or beyond, the catch is automatically operable.

When it is desired to open the bed 35 for use, the safety catch 135 may be prevented from entering the keeper 136 whereby to enable the bed to pass the catch without pause, in moving to the horizontal open position of the bed. The keeper 136 is exactly like the keepers 112 and has a bearing 140 through which a release rod 141 for the safety catch reciprocates and which is adapted to be extended through the keeper to retract the catch 135 in the same manner as the latch rods 122 and 123 are used to release the latches 111. The rod 141, together with the keeper 136, as best shown in Fig. 2, is disposed above the level of the box structure 45 enclosing the release mechanism for the latches 111, but is inclined downwardly at 142 and passes through an opening 143 in the upper wall of the box to engage the latch rod 122 with which it is integrally connected at 144 by welding. The rod 141 therefore operates simultaneously with and is projected and retracted by the latch release rod 122, with rod 123, from the operating handle 127, and is adapted to enter the keeper 136 when the handle 127 is manipulated to project the rods 122 and 123 into the keepers 112 for releasing the latches 111, and with the rod 141 thus blocking the keeper 136, if the operating handle is held in release position until the bed passes the safety catch 135, the catch will be prevented from entering the keeper, wherefore the bed may traverse its full opening movement without interruption. Should the bed be in the intermediate position with the catch 135 engaged in the keeper and it is desired to move the bed to full open position, it is only necessary to operate the handle 127 to project the rod 141 which presses the catch out of engagement and allows the bed to pass. If the handle 127, after actuation to release latches 111, is returned to normal position before the bed passes the catch 135, it will be necessary to repeat the operation of the handle to release the safety catch. While the safety catch has been illustrated and described for actuation by an auxiliary rod 141, it is entirely possible, where framing conditions of the car side frame and side finish arrangements permit, for the safety catch to be so located on the side wall 12 as to be engageable with the keeper 112 at that side of the bed and releasable by the latch rod 122.

From the foregoing it will be seen that a folding bed and seat arrangement for railway cars has been provided wherein automatic locking mechanism is provided for the bed in combination with safety mechanism for preventing accidental displacement of the bed, with means for manually releasing the locking mechanism and rendering the safety mechanism inoperative when operating the bed.

What is claimed is:

1. In a railway car room of the type in which a bed is pivotally mounted for swinging movement between a first terminal position extending horizontally from a room wall normal to a stationary surface in the room and a second terminal position latched vertically retracted against said wall, the combination with said bed of safety means for preventing accidental falling of the bed to said first terminal position when in unlatched condition near said second terminal position comprising cooperating catch and keeper members one of which is mounted on a side portion of the bed so as to swing through an arcuate path with movement of the bed between terminal positions and the other of which is mounted on said stationary surface at a point on said path near the upper end thereof so that when the bed swings toward said first terminal position from unlatched condition near said second terminal position the members will become engaged to stop the bed at an intermediate position near said second terminal position, and manually operable means for disengaging said members to release the bed for completion of its movement to said first terminal position.

2. In a railway car room of the type in which a bed is pivotally mounted at one end portion for endwise swinging movement between a first terminal position extending horizontally from an alcove in a room wall normal to another wall adjacent to said alcove and a second terminal position latched vertically retracted within the alcove, the combination with said bed of safety means for preventing accidental falling of the bed to said first terminal position when in unlatched condition near said second terminal position comprising cooperating catch and keeper members one of which is mounted on a side portion of the bed so as to swing through an arcuate path with movement of the bed between terminal positions and the other of which is mounted on said other wall of the room at a point on said path near the upper end thereof so that when the bed swings toward said first terminal position from unlatched condition near said second terminal position the members will become engaged to stop the bed at an intermediate position near said second terminal position, and manually operable means for disengaging said members to release the bed for completion of its movement to said first terminal position.

3. In a railway car room of the type in which a bed is pivotally mounted for swinging movement between a first terminal position extending horizontally from a room wall normal to a stationary surface in the room and a second terminal position latched vertically retracted against said wall, the combination with said bed of safety means for preventing accidental falling of the bed to said first terminal position when in unlatched condition near said second terminal position comprising a keeper mounted on a side portion of the bed so as to swing through an arcuate path with movement of the bed between terminal positions and a cooperating retractible catch normally projecting from said surface at a point on said path near the upper end thereof so that when the bed swings toward said first terminal position from unlatched condition near said second terminal position the catch will become engaged with the keeper to stop the bed at an intermediate position near said second terminal position, and manually operable means mounted on the bed engageable with the catch to release the bed for completion of its movement to said first terminal position.

4. In a railway car room of the type in which a bed is pivotally mounted for swinging movement between a first terminal position extending horizontally from a room wall normal to a stationary surface in the room and second terminal position latched vertically retracted against said wall, the combination with said bed of safety means for preventing accidental falling of the bed to said first terminal position when in unlatched condition near said second terminal position comprising a keeper mounted on a side portion of the bed so as to swing through an arcuate path with movement of the bed between terminal positions and a cooperating retractible catch normally projecting from said surface at a point on said path near the upper end thereof so that when the bed swings toward said first terminal position from unlatched condition near said second terminal position the catch will become engaged with the keeper to stop the bed at an intermediate position near said second terminal position, and manually operable means mounted on the bed and projectible through the keeper for engagement with the catch to release the bed for completion of its movement to said first terminal position.

5. In a railway car room of the type in which a bed is pivotally mounted for swinging movement between a first terminal position extending horizontally from a room wall normal to a stationary surface in the room and a second terminal position latched vertically retracted against said wall, the combination with said bed of safety means for preventing accidental falling of the bed to said first terminal position when in unlatched condition near said second terminal position comprising a keeper mounted on a side portion of the bed so as to swing through an arcuate path with movement of the bed between terminal positions and a cooperating retractible catch normally projecting from said surface at a point on said path near the upper end thereof so that when the bed swings toward said first terminal position from unlatched condition near said second terminal position the catch will become engaged with the keeper to stop the bed at an intermediate position near said second terminal position, an inclined strike plate mounted on the bed to engage the catch and retract the same for passage of the advancing edge of the bed, and manually operable means mounted on the bed and projectible through the keeper for retracting engagement with the catch on further advance of the bed in its swinging movement toward said first terminal position.

6. In a railway car room of the type in which a bed is pivotally mounted for swinging movement between a first terminal position extending horizontally from a room wall normal to a stationary surface in the room and a second terminal position in which the bed is held vertically retracted against said wall by manually releasable latching mechanism, the combination with said bed and latching mechanism of safety means for preventing accidental falling of the bed to said first terminal position when in unlatched condition near said second terminal position comprising cooperating catch and keeper members one of which is mounted on a side portion of the bed so as to swing through an arcuate path with movement of the bed between terminal positions and the other of which is mounted on said stationary surface at a point on said path near the upper end thereof so that when the bed swings toward said first terminal position from unlatched condition near said second terminal position the members will become engaged to stop the bed at an intermediate position near said second terminal position, and means operatively connected to said manually releasable latching mechanism for disengaging said members to release the bed for completion of its movement to said first terminal position.

JOSEPH L. BRACK.

REFERENCES CITED

The following references are of record in the file of this patent:

UNITED STATES PATENTS

| Number | Name | Date |
| --- | --- | --- |
| 343,348 | Taylor | June 8, 1886 |
| 598,841 | Barton | Feb. 8, 1898 |
| 764,842 | Fauber | July 12, 1904 |
| 819,686 | Bankson | May 1, 1906 |
| 1,358,209 | Hoils | Nov. 9, 1920 |
| 1,622,702 | Brown | Mar. 29, 1927 |
| 2,147,011 | Crawford | Feb. 14, 1939 |
| 2,310,548 | Roethel | Feb. 9, 1943 |
| 2,384,276 | Burbridge | Sept. 4, 1945 |